US006335859B1

(12) United States Patent
Chuang

(10) Patent No.: US 6,335,859 B1
(45) Date of Patent: Jan. 1, 2002

(54) OPTICAL DISK DRIVE ASSEMBLY HAVING A CONTROL PANEL MOUNTED MOVABLY THEREON

(75) Inventor: Kuei-Chu Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/523,976

(22) Filed: Mar. 13, 2000

(51) Int. Cl.$^7$ ................................. H05K 7/16; H05K 5/02
(52) U.S. Cl. ..................... 361/685; 361/680; 361/683; 361/727; 312/330.1; 312/333
(58) Field of Search ......................... 361/680–686, 361/727; 360/97.01, 98.01, 137; 312/330.1, 332.1, 333, 295; D14/132, 135, 136, 156, 338, 346, 378–382, 443, 445

(56) References Cited

U.S. PATENT DOCUMENTS

| 3,732,965 A | * | 5/1973 | Mero ........................ 197/186 A |
| 4,086,655 A | * | 4/1978 | Tanimoto et al. ............ 364/705 |
| D255,899 S | * | 7/1980 | Karas et al. ..................... D14/2 |
| 4,365,280 A | * | 12/1982 | Crosetti et al. ............... 360/137 |
| 4,595,993 A | * | 6/1986 | Yao ............................. 364/708 |
| 5,000,555 A | * | 3/1991 | Sato .............................. 350/530 |
| 5,062,609 A | * | 11/1991 | Hames et al. ................ 248/676 |
| 5,097,392 A | * | 3/1992 | Tanaka et al. ................ 361/391 |
| 5,187,641 A | * | 2/1993 | Muskatello et al. ......... 361/380 |
| 5,625,533 A | * | 4/1997 | kim et al. ..................... 361/681 |
| 5,637,928 A | * | 6/1997 | Nakajima et al. ........... 307/10.2 |
| 5,673,169 A | * | 9/1997 | Wicks ........................... 361/680 |
| 5,749,554 A | * | 5/1998 | Avila et al. ................. 248/311.2 |
| 5,805,676 A | * | 9/1998 | Martino ..................... 379/93.17 |
| 6,038,127 A | * | 3/2000 | Ries .............................. 361/680 |
| 6,131,051 A | * | 10/2000 | Beckert et al. ................. 700/83 |
| 6,201,540 B1 | * | 3/2001 | Gallup et al. ................. 345/339 |

FOREIGN PATENT DOCUMENTS

| JP | 61-8527 | * | 1/1986 | ............... F24C/1/00 |
| JP | 6-195152 | * | 7/1994 | ............... G06F/1/16 |

\* cited by examiner

Primary Examiner—Gerald Tolin
Assistant Examiner—Anatoly Vortman
(74) Attorney, Agent, or Firm—Pillsbury Winthrop LLP

(57) ABSTRACT

An optical disk drive assembly includes a hollow housing, an optical disk drive, and a control panel. The hollow housing has a bottom wall, and a front opening formed adjacent to a front end of the bottom wall. The optical disk drive is mounted inside the hollow housing. The optical disk drive is spaced apart from and is disposed above the bottom wall. The control panel is movably disposed between the optical disk drive and the bottom wall of the hollow housing. The control panel has a plurality of control keys connected electrically to the optical disk drive for manipulation of the optical disk drive. The control panel is mounted pivotally inside the hollow housing about a pivot axle that is perpendicular to the bottom wall for movement between an inward position where the control panel is received between the optical disk drive and the bottom wall to conceal the control keys under the optical disk drive, and an outward position where the control panel protrudes out of the front opening of the hollow housing to expose the control keys.

9 Claims, 6 Drawing Sheets

OPTICAL DISK DRIVE ASSEMBLY HAVING A CONTROL PANEL MOUNTED MOVABLY THEREON

BACKGROUND OF THE INVENTION

1. Field of the Invention

This invention relates to an optical disk drive assembly, more particularly to an optical disk drive assembly having a control panel mounted movably thereon.

2. Description of the Related Art

It is well known that notebook personal computers (PC) are equipped with optical disk drives, such as compact disk read-only-memory (CD-ROM) and digital versatile disk read-only-memory (DVD-ROM), for listening to music and watching video programs. However, the control keys for manipulation of the optical disk drives are liable to be depressed unintentionally when the optical disk drives are in use, thereby resulting in misoperation of the optical disk drives. In addition, the control keys of the optical drive disks occupy precious space on the keyboards of notebook PCs when the optical disk drives are not in use.

SUMMARY OF THE INVENTION

The object of the present invention is to provide an optical disk drive assembly in which the control keys for manipulation of an optical disk drive of the optical disk drive assembly will not be depressed unintentionally when the optical disk drive assembly is in use.

Another object of the present invention is to provide an optical disk drive assembly that will not occupy space on the keyboard of a notebook PC.

According to the present invention, the optical disk drive assembly comprises a hollow housing, an optical disk drive, and a control panel. The hollow housing has a bottom wall, and a front opening formed adjacent to a front end of the bottom wall. The optical disk drive is mounted inside the hollow housing. The optical disk drive is spaced apart from and is disposed above the bottom wall. The control panel is movably disposed between the optical disk drive and the bottom wall of the hollow housing. The control panel has a plurality of control keys connected electrically to the optical disk drive for manipulation of the optical disk drive. The control panel is mounted pivotally inside the hollow housing about a pivot axle that is perpendicular to the bottom wall for movement between an inward position where the control panel is received between the optical disk drive and the bottom wall to conceal the control keys under the optical disk drive, and an outward position where the control panel protrudes out of the front opening of the hollow housing to expose the control keys.

In the preferred embodiment, the optical disk drive assembly further has a locking mechanism for locking releaseably the control panel in the inward position, and a spring member for biasing the control panel to move from the inward position to the outward position when the control panel is released from the locking mechanism. The control panel is formed as a sector member having an arcuate side, an apex portion opposed to the arcuate side, and first and second radial sides that interconnect the arcuate side and the apex portion. The pivot axle extends downwardly from the apex portion of the sector member. The control keys are disposed adjacent to and along the first radial side of the sector member.

The hollow housing further has opposite first and second side walls extending upwardly from two opposite sides of the bottom wall and extending rearwardly from the front end of the bottom wall. The bottom wall has a top face, and an upright sleeve member projecting from the top face of the bottom wall adjacent to the first side wall and the front end of the bottom wall. The pivot axle is inserted into the upright sleeve member to connect pivotally the control panel to the hollow housing.

The locking mechanism includes a notch formed in the arcuate side adjacent to the first radial side of the sector member, and a spring-biased locking pin member disposed on the top face of the bottom wall adjacent to the second side wall and the front end of the bottom wall. The locking pin member is movable in a lateral direction substantially transverse to a front-to-rear direction of the hollow housing between a locking position wherein the locking pin member engages the notch when the control panel turns to the inward position, and an unlocking position wherein the locking pin member disengages from the notch.

Preferably, the control panel further has a stop member projecting radially from an intermediate portion of the arcuate side and distal from the notch. The stop member abuts against the locking pin member to limit movement of the control panel when the control panel turns to the outward position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
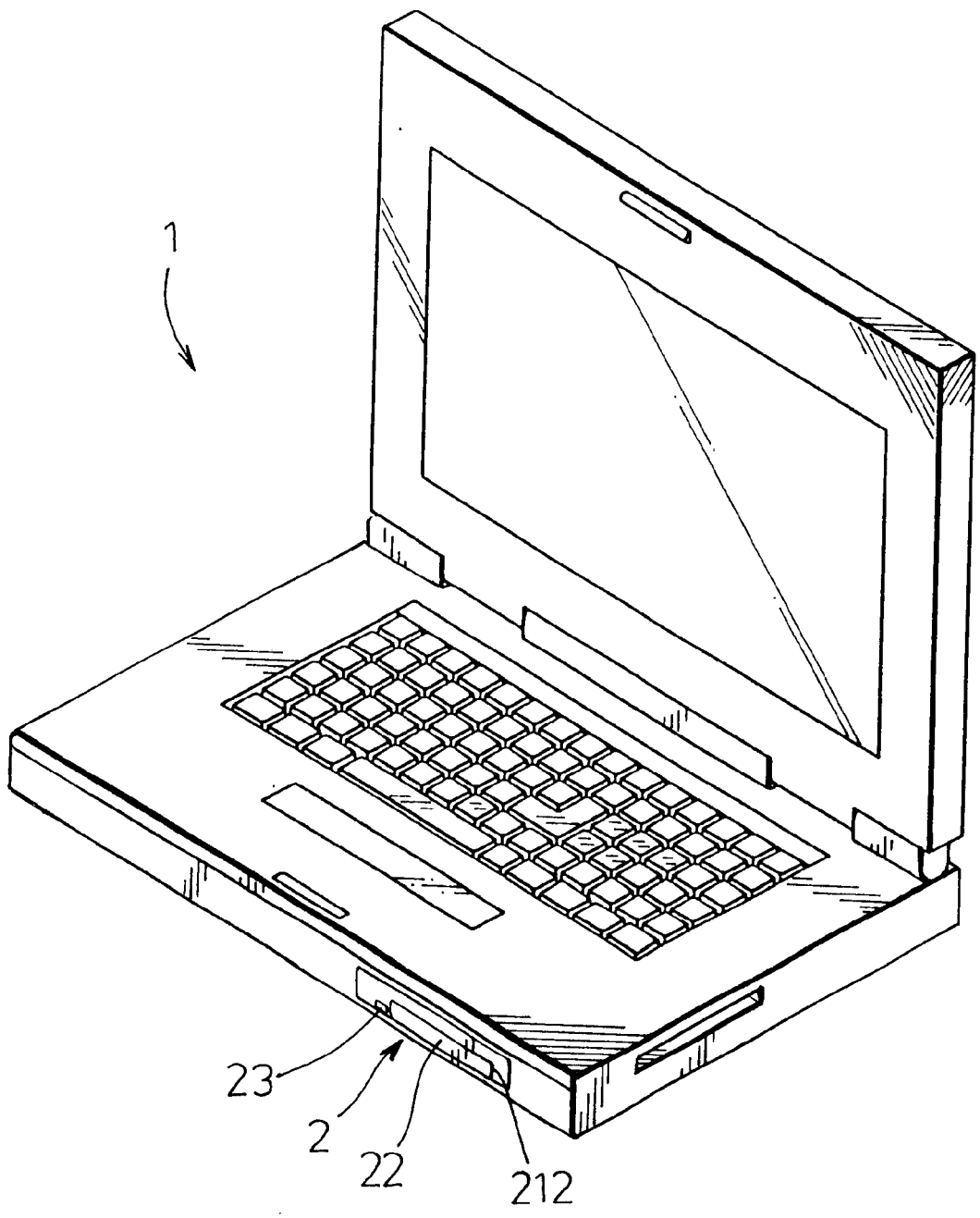
FIG. 1 is a perspective view of a preferred embodiment of an optical disk drive assembly according to the present invention, in which the optical disk drive assembly is incorporated in a notebook PC.
Figure 2:
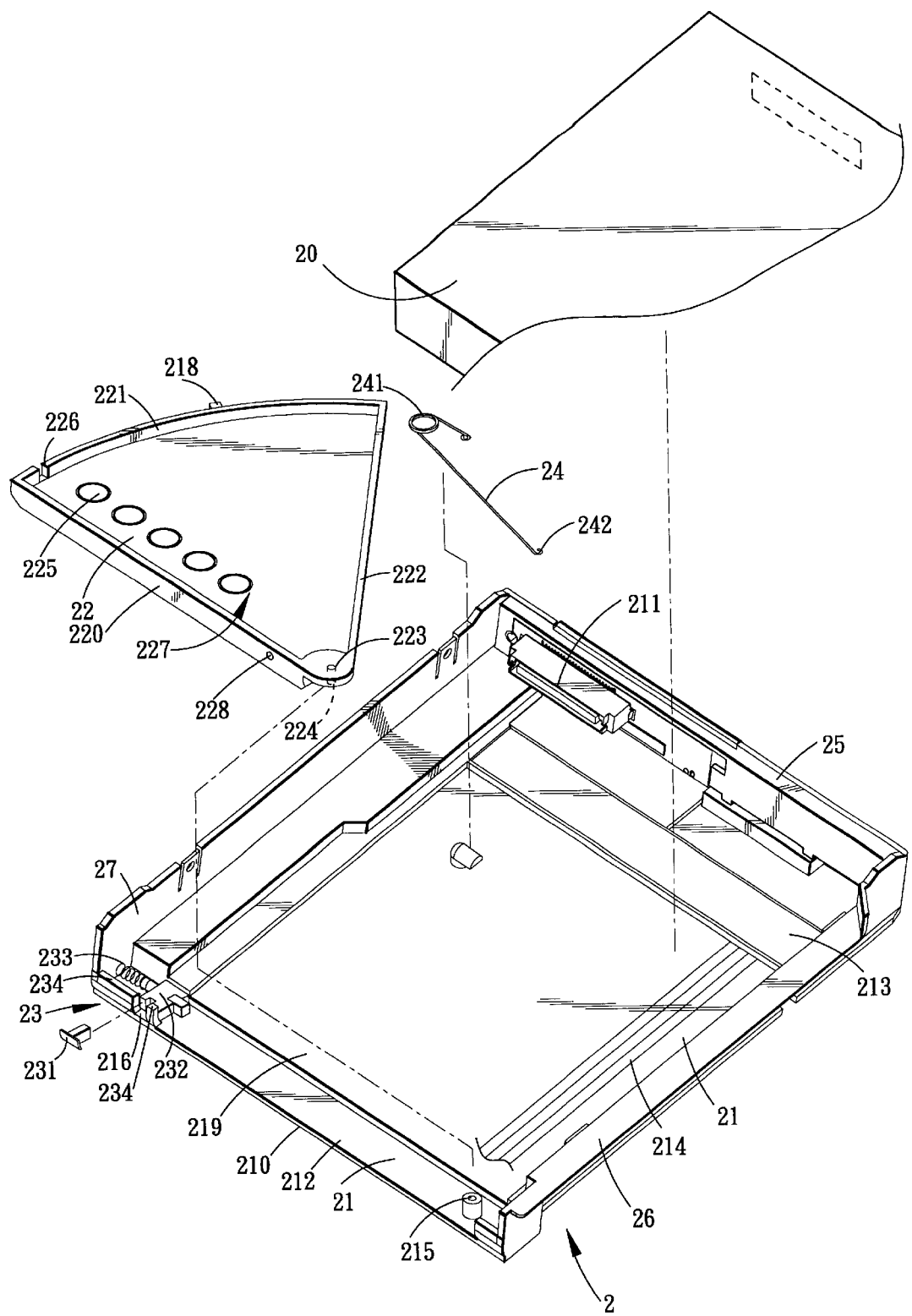
FIG. 2 is an exploded perspective view of the optical disk drive assembly of the preferred embodiment according to the present invention.
Figure 3:
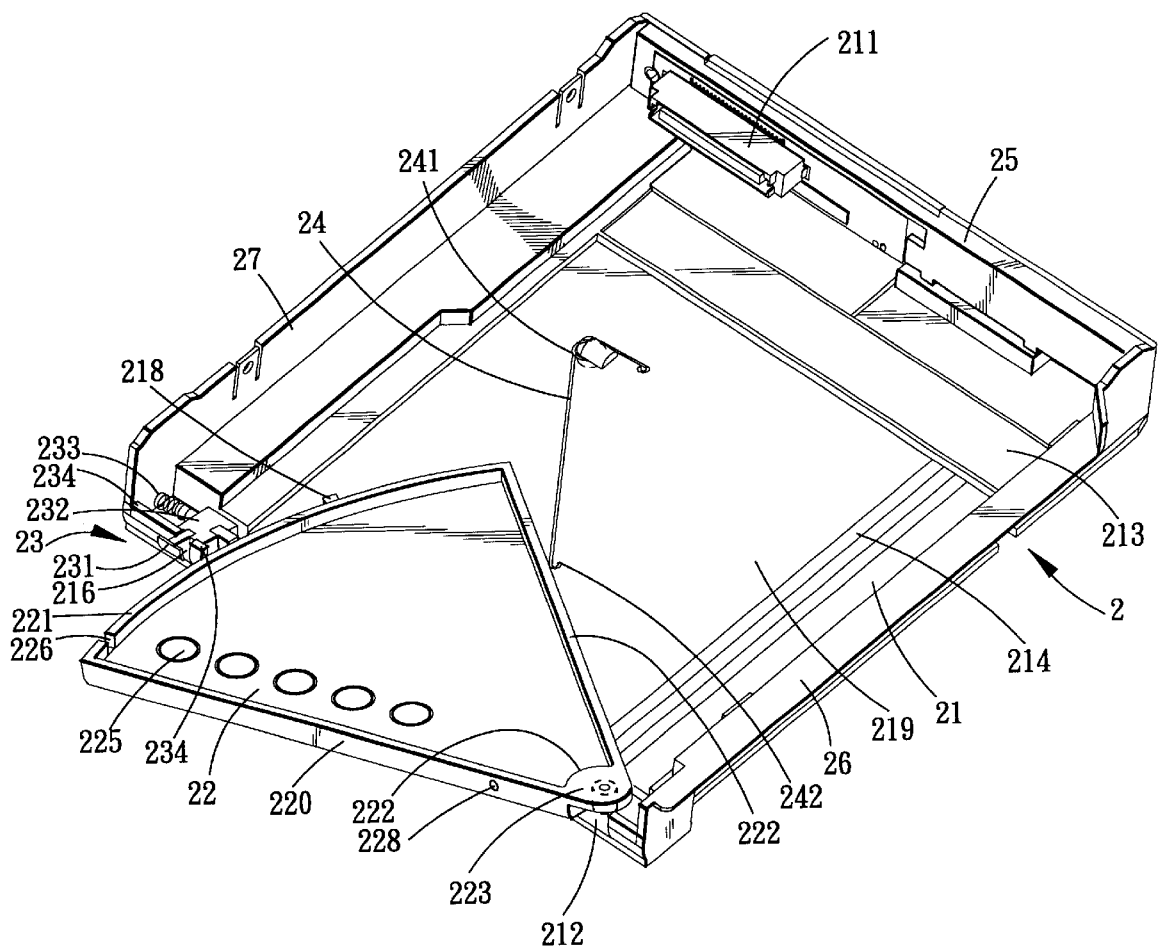
FIG. 3 is a perspective view of a hollow housing and a control panel of the optical disk drive assembly of the preferred embodiment according to the present invention.

Referring to FIGS. 1, 2 and 3, a preferred embodiment of an optical disk drive assembly according to the present invention is shown to comprise a hollow housing 2 adapted to be mounted within a notebook PC 1, an optical disk drive 20, such as a CD-ROM or DVD-ROM, and a control panel 22.

As shown, the hollow housing 2 is adapted to house the optical disk drive 20, and has a bottom wall 21, a front opening 212 formed adjacent to a front end 210 of the bottom wall 21, and a rear wall 25 extending upwardly from a rear end of the bottom wall 21 and opposed to the front opening 212. A circuit board 213 is mounted on the rear wall 25 and has an electrical connector 211 that is connected electrically to the optical disk drive 20. The hollow housing 2 further has opposite first and second side walls 26, 27 extending upwardly from two opposite sides of the bottom wall 21 and extending rearwardly from the front end 210 of the bottom wall 21. The bottom wall 21 has a top face 219, and an upright sleeve member 215 projecting from the top face 219 of the bottom wall 21 adjacent to the first side wall 26 and the front end 210 of the bottom wall 21.

Figure 4:
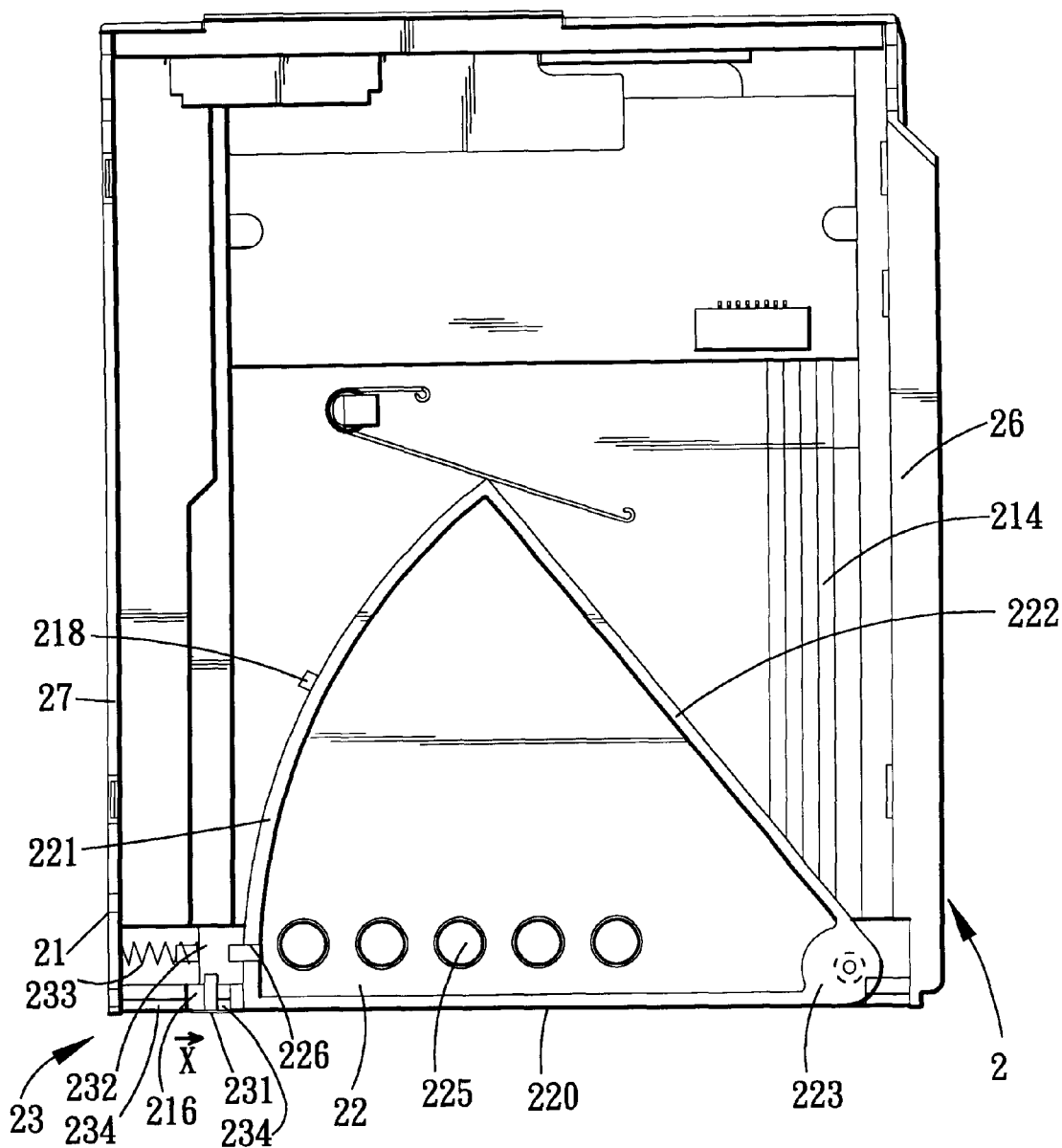
FIG. 4 is a top view of the optical disk drive assembly of FIG. 3, in which the control panel is in an inward position.
Figure 5:
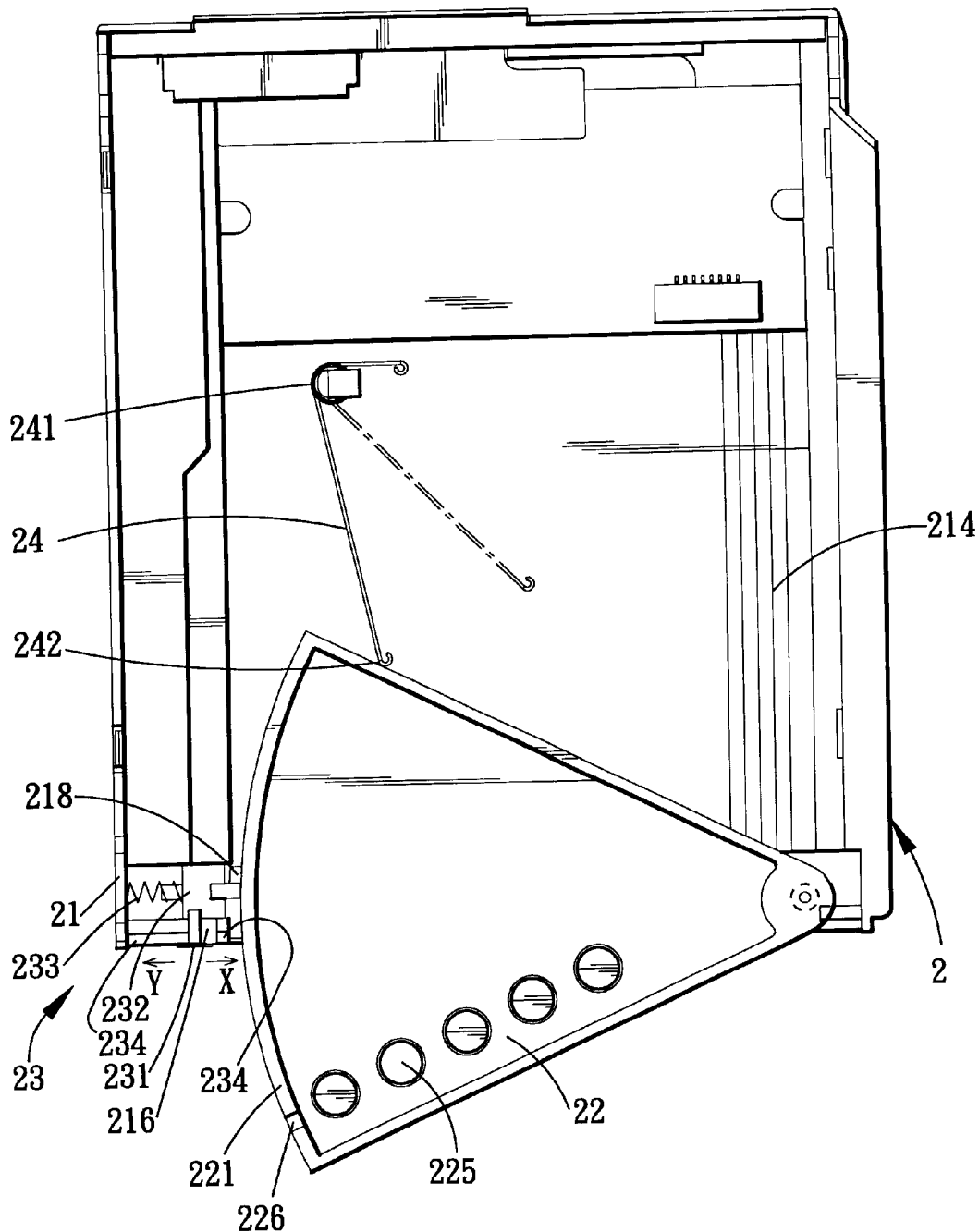
FIG. 5 is a top view of the optical disk drive assembly of FIG. 3, in which the control panel is in an outward position.

The optical disk drive 20 is mounted inside the hollow housing 2. The optical disk drive 20 is spaced apart from and is disposed above the bottom wall 21. The control panel 22 is movably disposed between the optical disk drive 20 and the bottom wall 21 of the hollow housing 2. The control panel 22 has a plurality of control keys 225 connected electrically to the optical disk drive 20 for manipulation of the optical disk drive 20, which will be described in greater detail hereinbelow. The control panel 22 is mounted pivotally inside the hollow housing 2 about a pivot axle 224. The control panel 22 is formed as a sector member and has an arcuate side 221, an apex portion 223 opposed to the arcuate side 221, and first and second radial sides 220, 222 that interconnect the arcuate side 221 and the apex portion 223. The pivot axle 224 extends downwardly from the apex portion 223 and is inserted into the upright sleeve member 215 in a direction perpendicular to the bottom wall 21 in order to connect pivotally the control panel 22 to the hollow housing 2. The control keys 225 are disposed adjacent to and along the first radial side 220 of the control panel 22. The control keys 225 include buttons for controlling several functions of the optical disk drive 20, for example, the play, forward, review, stop, and power functions. The control panel 22 is movable between an inward position and an outward position. In the inward position, the control panel 22 is received between the optical disk drive 20 and the bottom wall 21 to conceal the control keys 225 under the optical disk drive 20, as best illustrated in FIGS. 1 and 4. In the outward position, the control panel 22 protrudes out of the front opening 212 of the hollow housing 2 to expose the control keys 225, as best illustrated in FIG. 5.

Referring to FIGS. 2, 3 and 4, the optical disk drive assembly further has a locking mechanism 23 for locking releaseably the control panel 22 in the inward position. The locking mechanism 23 includes a notch 226 formed in the arcuate side 221 adjacent to the first radial side 220 of the control panel 22, a locking pin member 232 disposed on the top face 219 of the bottom wall 21 adjacent to the second side wall 27 and the front end 210 of the bottom wall 21, and a compression spring 233 biasing the locking pin member 232 to move to the locking position. The locking pin member 232 is movable between a locking position and an unlocking position in a lateral direction, as shown by arrows "X" and "Y" in FIG. 5, substantially transverse to a front-to-rear direction of the hollow housing 2. In the locking position, the locking pin member 232 engages the notch 226 when the control panel 22 turns to the inward position, as best illustrated in FIG. 4. In the unlocking position, the locking pin member 223 moves in the direction as shown by the arrow "Y" to disengage from the notch 226, as best illustrated in FIGS. 3 and 5.

Referring again to FIGS. 4 and 5, a torsion spring member 24 is fixed to the bottom wall 21 at an intermediate portion 241 of the spring member 24. The spring member 24 has a first end 242 abutting against the second radial side 222 of the control panel 22 in order to bias the control panel 22 to move from the inward position to the outward position. The control panel 22 has a stop member 218 projecting radially from an intermediate portion of the arcuate side 211 and distal from the notch 226. The stop member 218 abuts against the locking pin member 232 to limit movement of the control panel 22 when the control panel 22 turns to the outward position.

The front end 210 of the bottom wall 21 has two positioning walls 234 extending upwardly therefrom adjacent to and forwardly of the locking pin member 232. The positioning walls 234 are juxtaposed to one another in the lateral direction and have a gap 216 formed therebetween. The locking mechanism 23 further has a release lever 231 extending through the gap 216 in the front-to-rear direction. The release lever 231 has a first end connected to the locking pin member 232, and a second end extending forwardly and outwardly of the gap 216. The release lever 231 is movable in the gap 216 in the lateral direction when the locking pin member 232 moves between the locking position and the unlocking position. As such, the release lever 231 can be moved in a direction as shown by the arrow "Y" in FIG. 5 to disengage the locking pin member 232 from the notch 226 in order to permit movement of the control panel 22 from the inward position to the outward position due to the spring action of the spring member 24. The outward movement of the control panel 22 results in exposure of the control keys 225 from the hollow housing 2. When the control panel 22 is moved from the outward position to the inward position, the locking pin member 232 slides along the arcuate side 221 of the control panel 22 until the locking pin member 232 engages the notch 226. In this state, the control keys 225 on the control panel 22 can be concealed within the hollow housing 2 to avoid unintentional depressing of the control keys 225 when the optical disk drive 20 is actuated. Besides, the control keys 225 for manipulation of the optical disk drive 20 can be eliminated to save space on the keyboard of the notebook PC 1. The objects of the present invention are thus met.

Figure 6:
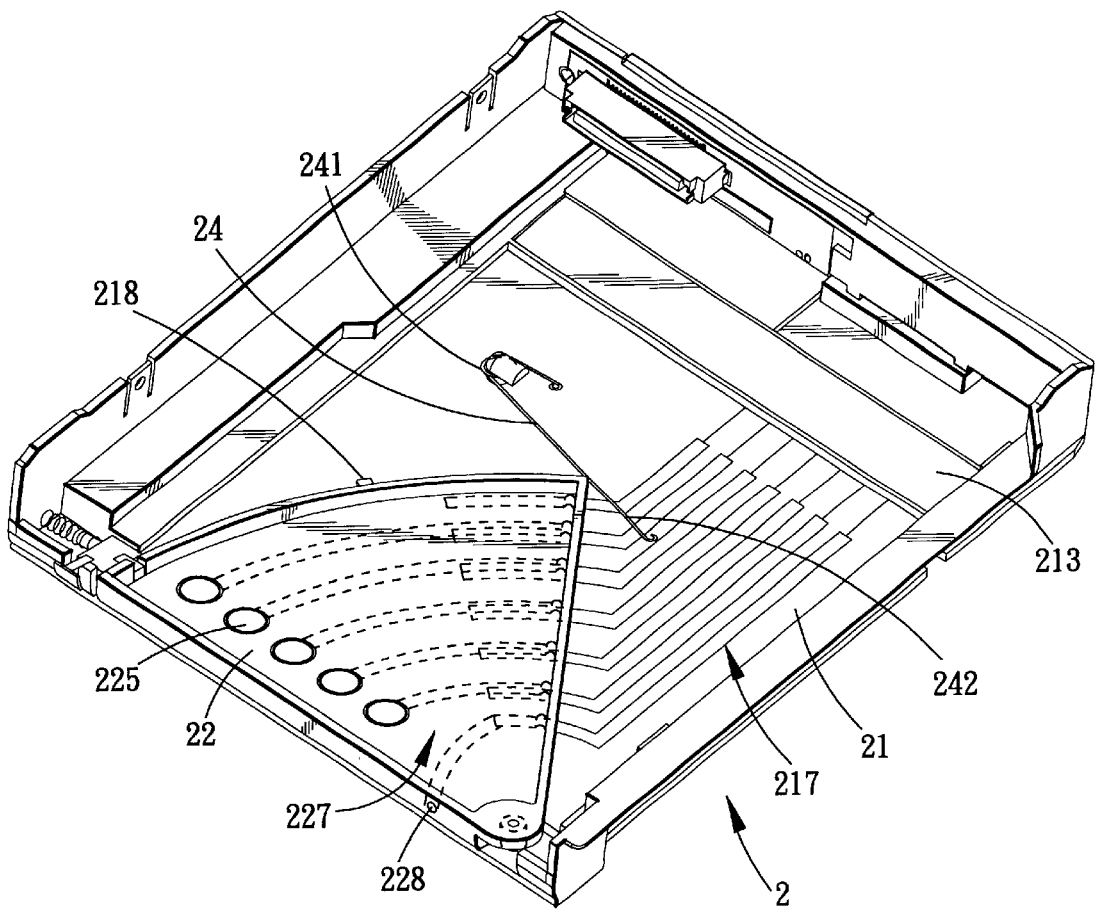
FIG. 6 is a perspective view of the optical disk drive assembly of FIG. 3, in which a circuit board is connected electrically to the control panel via conductive traces on the hollow housing and conductors on the control panel.

To transmit the control signals from the control keys 225 to the optical disk drive 20, the control keys 225 on the control panel 22 are connected electrically to the circuit board 213 by virtue of a ribbon cable 214. Alternatively, with reference to FIG. 6, seven arcuate conductive traces 217 are disposed on the top face 219 of the bottom wall 21 of the hollow housing 2. The control panel 22 has seven conductors 227 that contact electrically and slidably the conductive traces 217. The conductors 227 are connected electrically and respectively to the control keys 225, an LED 228 and a ground circuit (not shown).

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. An optical disk drive assembly, comprising:
   a hollow housing having a bottom wall, and a front opening formed adjacent to a front end of said bottom wall;
   an optical disk drive mounted inside said hollow housing, said optical disk drive being spaced apart from and being disposed above said bottom wall; and
   a control panel movably disposed between said optical disk drive and said bottom wall of said hollow housing, said control panel having a plurality of control keys connected electrically to said optical disk drive for manipulation of said optical disk drive, said control panel being mounted pivotally inside said hollow housing about a pivot axle that is perpendicular to said bottom wall for movement between an inward position where said control panel is received between said optical disk drive and said bottom wall to conceal said control keys under said optical disk drive, and an outward position where said control panel protrudes out of said front opening of said hollow housing to expose said control keys.

2. The optical disk drive assembly as claimed in claim 1, further comprising a locking mechanism for locking releaseably said control panel in said inward position, and a spring member for biasing said control panel to move from said inward position to said outward position when said control panel is released from said locking mechanism.

3. The optical disk drive assembly as claimed in claim 2, wherein said control panel is formed as a sector member having an arcuate side, an apex portion opposed to said arcuate side, and first and second radial sides that interconnect said arcuate side and said apex portion, said pivot axle extending downwardly from said apex portion of said sector member, said control keys being disposed adjacent to and along said first radial side of said sector member.

4. The optical disk drive assembly as claimed in claim 3, wherein said hollow housing further has opposite first and second side walls extending upwardly from two opposite sides of said bottom wall and extending rearwardly from said front end of said bottom wall, said bottom wall having a top face, and an upright sleeve member projecting from said top face of said bottom wall adjacent to said first side wall and said front end of said bottom wall, said pivot axle being inserted into said upright sleeve member to connect pivotally said control panel to said hollow housing.

5. The optical disk drive assembly as claimed in claim 4, wherein said locking mechanism includes a notch formed in said arcuate side adjacent to said first radial side of said sector member, and a spring-biased locking pin member disposed on said top face of said bottom wall adjacent to said second side wall and said front end of said bottom wall, said locking pin member being movable in a lateral direction substantially transverse to a front-to-rear direction of said hollow housing between a locking position wherein said locking pin member engages said notch when said control panel turns to said inward position, and an unlocking position wherein said locking pin member disengages from said notch.

6. The optical disk drive assembly as claimed in claim 5, wherein said control panel further has a stop member projecting radially from an intermediate portion of said arcuate side and distal from said notch, said stop member abutting against said locking pin member to limit movement of said control panel when said control panel turns to said outward position.

7. The optical disk drive assembly as claimed in claim 6, wherein said front end of said bottom wall has two positioning walls extending upwardly therefrom adjacent to and forwardly of said locking pin member, said positioning walls being juxtaposed to one another in said lateral direction, and having a gap formed therebetween, said locking mechanism further having a release lever extending through said gap in said front-to-rear direction, said release lever having a first end connected to said locking pin member, and a second end extending forwardly and outwardly of said gap, said release lever being movable in said gap in said lateral direction when said locking pin member moves between said locking position and said unlocking position.

8. The optical disk drive assembly as claimed in claim 1, further comprising a ribbon cable that interconnects electrically said control keys on said control panel and said optical disk drive.

9. The optical disk drive assembly as claimed in claim 1, wherein said bottom wall of said hollow housing has a plurality of conductive traces disposed on a top face thereof, said control panel having a plurality of conductors that contact electrically and slidably said conductive traces, said conductors being connected electrically and respectively to said control keys.

* * * * *